United States Patent [19]

Homann et al.

[11] Patent Number: 5,397,529
[45] Date of Patent: Mar. 14, 1995

[54] PROCESS FOR THE PREPARATION OF HIGH MOLECULAR WEIGHT POLYESTERS

[75] Inventors: Walter K. Homann, Dülmen; Thomas Grosse-Puppendahl, Haltern, both of Germany

[73] Assignee: GAF-Huels Chemie GmbH, Marl, Germany

[21] Appl. No.: 207,079

[22] Filed: Mar. 8, 1994

[30] Foreign Application Priority Data

Mar. 13, 1993 [DE] Germany .................. 43 08 409.9

[51] Int. Cl.$^6$ .................. B29B 7/00; B29C 45/00; C08F 6/00
[52] U.S. Cl. .................. 264/328.1; 528/272; 528/274; 528/302; 528/308; 528/308.1; 528/308.6; 528/489; 522/60; 522/71; 264/331.11
[58] Field of Search .............. 528/272, 274, 302, 308, 528/308.1, 308.6, 489; 522/60, 71; 264/328.1, 331.11

[56] References Cited

U.S. PATENT DOCUMENTS

| | | | |
|---|---|---|---|
| 3,714,291 | 1/1973 | Rockey | 525/17 |
| 4,425,287 | 1/1984 | Hesse et al. | 264/22 |
| 4,822,665 | 4/1989 | Scholz et al. | 428/222 |
| 5,047,455 | 9/1991 | Hesse et al. | 523/508 |
| 5,314,729 | 5/1994 | Ikezoe et al. | 428/15 |

FOREIGN PATENT DOCUMENTS

| | | |
|---|---|---|
| 0344733 | 12/1989 | European Pat. Off. . |
| 2303037 | 10/1976 | France . |
| 2509726A | 9/1976 | Germany . |
| 2509790A | 9/1976 | Germany . |
| 2552424A | 5/1977 | Germany . |

OTHER PUBLICATIONS

Patent Abstracts of Japan, vol. 4, No. 54 (C-8)(536), Apr. 23, 1980, JP-A-55 25462, Feb. 23, 1980.

*Primary Examiner*—Samuel A. Acquah
*Attorney, Agent, or Firm*—Oblon, Spivak, McClelland, Maier & Neustadt

[57] ABSTRACT

A process for producing high molecular weight polyester is provided which allows the production of small quantities of very high molecular weight polyester in a commercially convenient manner, comprising:

polycondensing an aromatic dicarboxylic acid with a mixture of an alkanediol and an alkenediol in the presence of a catalyst and in the substatial absence of oxygen, up to a viscosity number in the range from 50 to 140 cm$^3$/g to obtain a polyester, contacting said polyester with 0.001 to 8% by weight of an agent which forms free radicals and dissociates with a half-life of 5 seconds to 120 minutes at temperatures in the range from 130° to 350° C., and reacting said polyester and said agent which forms free radicals to provide the high molecular weight polyester.

11 Claims, No Drawings

PROCESS FOR THE PREPARATION OF HIGH MOLECULAR WEIGHT POLYESTERS

BACKGROUND OF THE INVENTION

1. Field of the Invention

The present invention relates to a process for the preparation of high molecular weight polyesters by reaction of an aromatic dicarboxylic acid with a mixture of alkane- and alkenediols in the presence of a catalyst, and in the substantial absence of oxygen.

2. Discussion of the Background

High molecular weight polyesters are materials having specific properties which are useful as a raw material for producing industrial high-quality, heavy-duty products. Frequently in the production of industrial high-quality products, relatively small amounts of a polyester with an exactly predetermined high molecular weight are demanded.

Since large amounts of polyesters of uniform molecular weight are conventionally produced by either large scale industrial continuous or batch-wise processes, it is usually uneconomical and industrially difficult to provide smaller partial amounts having a high specified molecular weight.

Some polyesters of high molecular weight are known in the prior art. They contain, inter alia, residues of unsaturated monomer components which are cross-linked, if appropriate, with compounds which are unstable to heat (see DE-AS 2 509 726; 2 509 790; and 2 552 424). One characteristic of these known high MW polyesters is that the final molecular weight must be specified prior to their preparation. Manipulation of the molecular weight subsequent to production is impossible or leads to a decrease in the properties of the product.

Thus, a method is needed which allows the preparation of high MW polyester in small amounts at specified molecular weights.

SUMMARY OF THE INVENTION

Accordingly, one object of the present invention is to provide a method for preparing small amounts of polyesters of high molecular weight.

These and other objects have been satisfied by the discovery of a process in which the polycondensation stage is carried out up to a viscosity number in the range from 50 to 140 cm$^3$/g, and the polyester thus obtained is charged with 0.001 to 8% by weight of an agent which forms free radicals and dissociates with a half-life of 5 seconds to 120 minutes at temperatures in the range from 130° to 350° C., and is then further reacted in the melt until the necessary viscosity number is reached.

DETAILED DESCRIPTION OF THE PREFERRED EMBODIMENTS

The polyesters of the present invention are prepared by esterification or transesterification and subsequent polycondensation of aromatic dicarboxylic acids or conventional polyester-forming derivatives thereof and the corresponding diol mixture in the presence of catalysts (Sorenson and Campbell, Preparative Methods of Polymer Chemistry, Interscience Publishers Inc., (N.Y.), 1961, pages 111 to 127; Kunststoff-Handbuch (Plastics Handbook), Volume VIII, C. Hanser Verlag Munich, 1973; and J. Polym. Sci., Part A 1, 4, pages 1851 to 1859, 1966).

The reaction temperatures are in the range from 160° to 350° C., preferably in the range from 170° to 280° C. The process is carried out in the substantial absence of oxygen, either under normal pressure or in vacuo. If the reaction is performed under normal pressure, it is carried out in an inert gas atmosphere. Suitable inert gases include noble gases, nitrogen and carbon dioxide. The polycondensation stage is preferably carried out in vacuo.

The process of the present invention is preferably used to prepare poly(ethylene terephthalate) (PET) or poly(butylene terephthalate) (PBT).

A suitable aromatic dicarboxylic acid for use in the present invention is terephthalic acid. However, other aromatic dicarboxylic acids, such as phthalic acid, isophthalic acid or naphthalene-dicarboxylic acid, or mixtures thereof can also be employed.

Up to 30 mol % of the aromatic dicarboxylic acid in the polyesters can be replaced by other conventional $C_2$–$C_{36}$ dicarboxylic acids. Suitable dicarboxylic acids include isophthalic acid, phthalic acid, 1,4-cyclohexanedicarboxylic acid, adipic acid, sebacic acid, azelaic acid, decanedicarboxylic acid and dimeric fatty acid.

The diol component is a combination of $C_2$–$C_{12}$ alkanediol and $C_4$–$C_{12}$ alkenediols. Preferred alkanediols include ethylene glycol and butane-1,4-diol, while preferred alkenediols include butene-1,4-diol and 3-methyl-2-pentene-1,5-diol.

Up to 30 mol % of the alkanediol component of the polyester can be replaced by other known diols, such as neopentylglycol, 1,5-pentanediol, 1,6-hexanediol, 1,4- or 1,3-dimethylolcyclohexane or 1,12-dodecanediol, or a mixture thereof.

The alkanediol: alkenediol mol % ratio used is from 0.1:99.9 to 99.9:0.1, preferably 80:20 to 99.5:0.5.

The term polyester, as used herein, also includes block copolyesters. Such products are described, for example, in Chimia 28 (9), pages 544 to 552 (1974) and in Rubber Chemistry and Technology 50, pages 688 to 703 (1977). In addition to the above-mentioned aromatic dicarboxylic acids and diols, these block copolyesters contain a poly(oxyalkylene)diol having a molecular weight in the range from about 600 to 2,500. Preferred poly(oxyalkylene)diols are poly(oxyethylene)diol, poly(oxypropylene)diol and poly(oxytetramethylene)diol. When present, the content of poly(oxyalkylene)diols is in the range from 4 to 40% by weight, preferably from 10 to 35% by weight (based on the total block copolyester).

The polycondensation stage is initially carried out up to a viscosity number J=50–140 cm$^3$/g, preferably J=80–102 cm$^3$/g. The mixture is then allowed to further react in the melt in a second separate stage in the presence of an agent which forms free radicals (hereinafter referred to as the free radical agent).

This second stage reaction is carried out at temperatures in the range from 130° to 350° C., preferably from 180° to 280° C. The free-radical agents are those for which the dissociation half-life at the above-mentioned temperatures is in the range from 5 seconds to 120 minutes, preferably from 1 to 60 minutes.

The free-radical forming agents are employed in an amount in the range from 0.001 to 8% by weight, preferably from 0.01 to 5% by weight, based on the polyester. Suitable free-radical agents are organic peroxides, such as (cyclo)aliphatic and aromatic peroxides, hydroperoxides or perketals, such as 2,5-bis(tert-butylperoxy)-2,5-dimethylhexane, diisopropylbenzene monohydroperoxide, dicumyl peroxide and 3,3,6,6,9,9-hexamethyl-1,2,4,5-tetraoxacyclononane, organic compounds having an unstable C—C bond, such as 2,3-dimethyl-2,3-diphenylbutane, 3,4-dimethyl-3,4-diphenylhexane and poly-1,4-diiso-propylbenzene, or organic compounds having an unstable N—N bond, such as 2,2'-azo-bis(2-acetoxypropane).

The free-radical agents useful in the process are commercially available. Further details, such as dissociation temperatures and half-lives can be found in the manufacturers product bulletins. (For example, see Organic Peroxides for Cross-linking Polyolefins and Elastomers by elf atochem, Germany, from 10/92, or Initiators for Polymer Production by Akzo, The Netherlands, from 4/89.)

The polyesters which have been prepared by the process of the present invention have a viscosity number $J \leq 400$ cm$^3$/g, preferably from 100 to 300 cm$^3$/g.

Viscosity numbers are used throughout the present text since these are relatively easy values to determine experimentally under production conditions. Viscosity numbers of polybutylene terephthalate homo- and copolymers, for instance, can be converted to weight average molecular weights using the following formulae:

$$J = \eta + 0.26 * \eta * J * C$$

$$\eta = 0.000437 * M^{0.72}$$

wherein J is the viscosity number in cm$^3$/g, $\eta$ is the intrinsic viscosity, M is the weight average molecular weight and C is the concentration of the polymer solution used in the viscosity determination in g/ml. Thus, for example, viscosity numbers in the range from 100 to 300 correspond to molecular weights from 39110 to 134900, respectively.

The polyesters obtained according to the present invention can be processed into shaped articles by conventional methods such as injection molding or extrusion on conventional machines.

The polyesters can also contain conventional auxiliaries and additives. Suitable auxiliaries and additives include nucleating agents, matting agents, flow agents or other processing auxiliaries, as well as pigments, fillers and reinforcing substances.

Nucleating, matting and flow agents or other processing auxiliaries, when present, are used in amounts of up to 6% by weight, preferably from 0.2 to 3.5% by weight, based on the total mixture.

Pigments, fillers and reinforcing substances—when present, are used in amounts of up to 60% by weight, preferably from 1 to 50% by weight, based on the total mixture.

The free-radical agent may be added, either alone or together with other additives, during discharge from the polycondensation vessel via an extruder or during compounding on a mixing extruder. Single- or twin-screw kneaders or co-kneaders can also be used. The mixing temperature is between 160° and 320° C., preferably between 220° and 280° C., with the residence time being between a few seconds and several minutes. For easier metering of the free-radical agent into the extruder, it may be appropriate in some cases to use a carrier material, such as that obtained by incorporating the free-radical agent into a suitable polymer. This has the advantage that even very small amounts of free-radical agents can be reliably metered in.

The process according to the present invention has a number of advantages:

Large amounts of base polycondensate can be prepared quickly and economically by a continuous or batchwise process.

The desired high final viscosity number (and thus high molecular weight) can be achieved very quickly.

In particular, small amounts of polyester can be adjusted economically to a required high viscosity number (molecular weight) in a controlled manner.

The good general properties, such as heat and mechanical stability, processing stability, and intrinsic color are not adversely affected.

Using the polyesters obtained by the process of the present invention, molding compositions can be obtained, from which films, sheathings, profiles, pipes, hollow bodies and industrial articles can be produced.

EXAMPLES

The viscosity number J was determined using the method described below:

The viscosity number (J value) was measured on solutions of 0.5 g of polyester in 100 ml of phenol/o-dichlorobenzene (in a weight ratio of 1:1) at 25° C. (DIN 16 779). Within a given polyester or copolyester, the J value directly correlates with molecular weight, with higher J value being higher MW.

The experiments labelled with letters are Comparative Examples and not according to the present invention.

Experiment A1

100 parts by weight of a thermoplastic polyester having a J value of 108 cm$^3$/g (Mw=42,970), which was prepared by transesterification of dimethyl terephthalate with butane-1,4-diol using isopropyl titanate as the catalyst and subsequent polycondensation under reduced pressure were melted at 235° to 250° C. in a twin-shaft kneader without a free-radical agent, and the melt was then discharged, granulated and dried.

Experiment A2

100 parts by weight of a thermoplastic polyester having a J value of 108 cm$^3$/g (Mw=42,970), which was prepared by transesterification of dimethyl terephthalate with butane-1,4-diol using isopropyl titanate as the catalyst and subsequent polycondensation under reduced pressure, were melted with 1% by weight of 2,3-dimethyl-2,3-diphenylbutane in a twin-shaft kneader at 235° to 250° C. and the melt was then discharged, granulated and dried.

Experiment B 100 parts by weight of a thermoplastic polyester having a J value of 110 cm$^3$/g (Mw=43,940), which was prepared by reaction of dimethyl terephthalate with a diol comprising 95 mol % of butane-1,4-diol and 5 mol % of butene-1,4-diol using isopropyl titanate as the catalyst and subsequent polycondensation under reduced pressure, were melted in a twin-shaft kneader at 235° to 250° C. without a free radical agent and the melt was then discharged, granulated and dried.

Experiments 1–7

The experiment described in Comparison B was repeated, but the polyester was melted in accordance with Table I with various free radical agents in various concentrations in a twin-shaft kneader at 235° to 250° C. and the melt was then discharged, granulated and dried.

V. 2,2'-Azo-di(2-acetoxypropane) (LUAZO® AP from elf atochem, France)

TABLE I

| Experiment No. | Diol component [mol %] | | Initiator type *) | Initiator concentration based on the polyester [% by weight] | Viscosity number J after treatment according to the invention [cm³/g] | Viscosity number J of the starting substance [cm³/g] | Difference in J values in relation to the J value of the starting substance [%] |
|---|---|---|---|---|---|---|---|
| | Butane-1,4-diol | Butene-1,4-diol | | | | | |
| A1 | 100 | 0 | — | — | 99 | 108 | −8.3 |
| A2 | 100 | 0 | I | 1 | 103 | 108 | −4.6 |
| B | 95 | 5 | — | — | 111 | 110 | 0.9 |
| 1 | 95 | 5 | I | 1 | 170 | 110 | 54.5 |
| 2 | 95 | 5 | I | 0.5 | 135 | 110 | 22.7 |
| 3 | 95 | 5 | III | 0.2 | 142 | 110 | 29.1 |
| 4 | 95 | 5 | III | 1.5 | 205 | 110 | 86.4 |
| 5 | 95 | 5 | IV | 1 | 150 | 110 | 36.4 |
| 6 | 95 | 5 | V | 1 | 225 | 110 | 104.5 |
| 7 | 95 | 5 | V | 0.5 | 167 | 110 | 51.8 |
| C | 80 | 20 | — | — | 112 | 112 | 0 |
| 8 | 80 | 20 | II | 1 | 161 | 112 | 43.8 |
| 9 | 80 | 20 | III | 0.2 | 175 | 112 | 56.3 |
| D | 97 | 3 | — | — | 110 | 112 | −1.8 |
| 10 | 97 | 3 | V | 1 | 157 | 112 | 40.2 |

Experiment C 100 parts by weight of a thermoplastic polyester having a J value of 112 cm³/g (Mw=44,910), which was prepared by transesterification of dimethyl terephthalate with a diol comprising 80 mol % of butane-1,4-diol and 20 mol % of butene-1,4-diol using isopropyl titanate as the catalyst and subsequent polycondensation under reduced pressure, were melted in accordance with Table I at 235° to 250° C. in a twin-shaft kneader without a free radical agent and the melt was then discharged, granulated and dried.

Experiments 8 and 9

The experiment described in Comparison C was repeated, but the polyester was melted in accordance with Table I with various free radical agents in various concentrations in a twin-shaft kneader at 235° to 250° C. and the melt was then discharged, granulated and dried.

Experiment D 100 parts by weight of a thermoplastic polyester having a J value of 112 cm³/g (Mw=44,910), which was prepared by transesterification of dimethyl terephthalate with a diol comprising 97 mol % of butane-1,4-diol and 3 mol % of butene-1,4-diol using isopropyl titanate as the catalyst and subsequent polycondensation under reduced pressure, were melted at 235° to 250° C. in a twinshaft kneader without a free radical agent and the melt was then discharged, granulated and dried.

Experiment 10

The experiment described in Comparison D was repeated, but the polyester was melted with 1% by weight of 2,2'-azo-bis-(2-acetoxy-propane), based on the polyester, in a twin-shaft kneader at 235° to 250° C. and the melt was then discharged, granulated and dried.

The free radical agents used were:
I. 2,3-Dimethyl-2,3-diphenylbutane (INTERO® CCDFB from Peroxid-Chemie, Höllriegelskreuth)
II. Poly-1,4-diisopropylbenzene (INTEROX® VP 156 from Peroxid-Chemie, Höllriegelskreuth)
III. 3,3,6,6,9,9-Hexamethyl-1,2,4,5-tetraoxacyclononane (INTEROX® HMCN-40-IC-3 from Peroxid-Chemie, Höllriegelskreuth)
IV. 2,5-Dimethyl-2,5-di(tert-butyl-peroxy)-hex-3-yne (LUPERCO® 130 from elf atochem, France)

What is claimed as new and desired to be secured by Letters Patent of the United States is:

1. A method for the preparation of a high molecular weight polyester comprising:
   polycondensing an aromatic dicarboxylic acid with a mixture of an alkanediol and an alkenediol in the presence of a catalyst and in the substantial absence of oxygen, up to a viscosity number in the range from 50 to 140 cm³/g to obtain a polyester,
   contacting said polyester with 0,001 to 8% by weight of an agent which forms free radicals and dissociates with a half-life of 5 seconds to 120 minutes at temperatures in the range from 130° to 350° C., and
   reacting said polyester and said agent which forms free radicals to provide the high molecular weight polyester.

2. The process according to claim 1, wherein said polycondensing step is carried out to a viscosity number in the range from 80 to 120 cm³/g.

3. The process according to claim 1, wherein said agent which forms free radicals is used in an amount in the range from 0.01 to 5% by weight.

4. The process according to claim 1, wherein said agent which forms free radicals dissociates at a temperature in the range from 180° to 280° C.

5. The process according to claim 1, wherein said agent which forms free radicals dissociates with a half-life in the range from 1 to 60 minutes.

6. The process according to claim 1, wherein said agent which forms free radicals is an organic peroxide.

7. The process according to claim 1, wherein said agent which forms free radicals has an unstable C—C bond.

8. The process according to claim 1, wherein said agent which forms free radicals has an unstable N—N bond.

9. The process according to claim 1, wherein the high molecular weight polyester has a final viscosity number of ≦400 cm³/g.

10. The process according to claim 1, wherein the high molecular weight polyester has a final viscosity number in the range from 100 to 300 cm³/g.

11. A method for preparation of a molded article selected from the group consisting of films, sheathings, profiles, pipes, and hollow bodies comprising molding a polyester as claimed in claim 1 by injection molding.

* * * * *

UNITED STATES PATENT AND TRADEMARK OFFICE
CERTIFICATE OF CORRECTION

PATENT NO.   : 5,397,529
DATED        : March 14, 1995
INVENTOR(S)  : Walter K. HOMANN, et al.

It is certified that error appears in the above-indentified patent and that said Letters Patent is hereby corrected as shown below:

On the title page, Item [30], the Foreign Application Priority Number should read:

--43 08 049.9--

Signed and Sealed this

Sixth Day of June, 1995

Attest:

BRUCE LEHMAN

Attesting Officer

Commissioner of Patents and Trademarks